(12) United States Patent
Kaufman et al.

(10) Patent No.: US 9,079,555 B2
(45) Date of Patent: Jul. 14, 2015

(54) METHODS AND APPARATUS TO DISRUPT THE ENGINE OF A VEHICLE

(75) Inventors: Steven L. Kaufman, Port Hueneme, CA (US); Jack E. White, Santa Barbara, CA (US); Vincent C. Hougo, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 636 days.

(21) Appl. No.: 13/372,073

(22) Filed: Feb. 13, 2012

(65) Prior Publication Data

US 2012/0173120 A1 Jul. 5, 2012

Related U.S. Application Data

(63) Continuation-in-part of application No. 12/581,087, filed on Oct. 16, 2009, now Pat. No. 8,116,966.

(51) Int. Cl.
*B60R 25/04* (2013.01)
*F02D 41/04* (2006.01)
*B60R 25/045* (2013.01)

(52) U.S. Cl.
CPC .............. *B60R 25/04* (2013.01); *B60R 25/045* (2013.01); *F02D 41/042* (2013.01)

(58) Field of Classification Search
CPC ...... F02D 41/042; B60R 25/04; B60R 25/045
USPC ............ 701/36, 108, 112; 180/167, 168, 169
See application file for complete search history.

(56) References Cited

U.S. PATENT DOCUMENTS

| 4,236,594 A | * | 12/1980 | Ramsperger .................. 180/167 |
| 4,619,231 A | * | 10/1986 | Stolar et al. .................. 123/333 |
| 4,660,528 A | * | 4/1987 | Buck ............................ 123/333 |
| 5,218,367 A | * | 6/1993 | Sheffer et al. ................ 342/457 |
| 5,293,527 A | * | 3/1994 | Sutton et al. ................. 340/12.1 |
| 5,311,197 A | * | 5/1994 | Sorden et al. ................ 342/457 |
| 5,513,244 A | * | 4/1996 | Joao et al. ................. 455/404.1 |
| 5,533,589 A | * | 7/1996 | Critzer ........................ 180/287 |
| 5,832,394 A | * | 11/1998 | Wortham ......................... 701/1 |
| 5,835,868 A | * | 11/1998 | McElroy et al. ................. 701/2 |
| 5,907,290 A | * | 5/1999 | Turner et al. ................ 340/12.1 |
| 5,933,075 A | * | 8/1999 | Ditson ..................... 340/426.11 |
| 5,937,823 A | * | 8/1999 | Reeder et al. ................ 123/335 |

(Continued)

FOREIGN PATENT DOCUMENTS

| FR | 2 793 973 A1 | 1/2000 |
| WO | WO 99/43513 | 9/1999 |
| WO | WO 2011/046777 A1 | 4/2011 |

OTHER PUBLICATIONS

U.S. Appl. No. 12/581,087, filed Oct. 16, 2009.

(Continued)

*Primary Examiner* — Hieu T Vo
*Assistant Examiner* — Sherman Manley
(74) *Attorney, Agent, or Firm* — Daly, Crowley, Mofford & Durkee, LLP

(57) ABSTRACT

Methods and apparatus to transmit a range of frequencies targeting a vehicle, monitoring performance of an engine of the vehicle, determining a first frequency in the range of frequencies that disrupts operation of the engine, and dwelling on the first frequency to disrupt the engine, reducing power and continuing to dwell at the first frequency to maintain disruption of the engine.

18 Claims, 5 Drawing Sheets

(56) References Cited

U.S. PATENT DOCUMENTS

| | | | |
|---|---|---|---|
| 5,952,600 A * | 9/1999 | Herr | 89/1.11 |
| 6,072,248 A * | 6/2000 | Muise et al. | 307/10.2 |
| 6,232,874 B1 * | 5/2001 | Murphy | 340/426.19 |
| 6,232,884 B1 * | 5/2001 | Gabbard | 340/12.27 |
| 6,371,000 B1 * | 4/2002 | Hutmacher et al. | 89/1.11 |
| 6,647,328 B2 * | 11/2003 | Walker | 701/36 |
| 6,862,524 B1 * | 3/2005 | Nagda et al. | 701/420 |
| 6,897,762 B2 * | 5/2005 | Howells | 340/5.31 |
| 6,965,816 B2 * | 11/2005 | Walker | 701/16 |
| 6,995,667 B2 * | 2/2006 | He et al. | 340/539.13 |
| 7,049,709 B2 * | 5/2006 | Boggs | 307/10.2 |
| 7,091,821 B2 * | 8/2006 | Lessard et al. | 340/5.61 |
| 7,182,362 B2 * | 2/2007 | Yeakel | 280/433 |
| 7,554,442 B2 * | 6/2009 | Twitchell, Jr. | 340/539.26 |
| 7,598,846 B2 * | 10/2009 | Griffin et al. | 340/426.11 |
| 7,825,795 B2 * | 11/2010 | Peel et al. | 340/539.16 |
| 7,916,016 B2 * | 3/2011 | Auerbach et al. | 340/539.26 |
| 8,387,735 B2 * | 3/2013 | Elson | 180/167 |
| 2001/0040503 A1 * | 11/2001 | Bishop | 340/426 |
| 2002/0070850 A1 * | 6/2002 | Michala et al. | 340/426 |
| 2005/0184858 A1 * | 8/2005 | Griffin et al. | 340/426.11 |
| 2005/0195069 A1 * | 9/2005 | Dunand | 340/5.61 |
| 2005/0242971 A1 * | 11/2005 | Dryer | 340/870.11 |
| 2005/0263120 A1 | 12/2005 | Fifelski et al. | |
| 2006/0250272 A1 * | 11/2006 | Puamau | 340/825.69 |
| 2006/0265128 A1 * | 11/2006 | Miller | 701/213 |
| 2007/0155327 A1 * | 7/2007 | Twitchell, Jr. | 455/41.2 |
| 2008/0015744 A1 * | 1/2008 | Lund | 701/2 |
| 2008/0223641 A1 * | 9/2008 | Elson | 180/167 |
| 2009/0085731 A1 * | 4/2009 | Boggess | 340/426.12 |
| 2009/0219135 A1 * | 9/2009 | Harvey et al. | 340/5.82 |
| 2009/0248222 A1 * | 10/2009 | McGarry et al. | 701/2 |
| 2009/0322510 A1 * | 12/2009 | Berger et al. | 340/539.1 |
| 2011/0093180 A1 | 4/2011 | Hougo et al. | |
| 2011/0133912 A1 | 6/2011 | Tesman | |

OTHER PUBLICATIONS

International Search Report for International Application No. PCT/US2010/051520, filed Oct. 5, 2010, International Search Report dated Feb. 3, 2011, 4 pages.

Written Opinion of the International Searching Authority for International Application No. PCT/US2010/051520, filed Oct. 5, 2010, Written Opinion dated Feb. 3, 2011, 6 pages.

Response to the extended European search filed on Sep. 12, 2013 in European Patent Application No. 12166887.5, 22 pages.

European Patent Office Search Report, Application No. 12166887.5-1655/2625952, Jul. 17, 2013, 9 pages.

EP Patent Application No. 12 166 887.5-1655 Notice of Allowance dated Jan. 12, 2015 22 pages.

* cited by examiner

METHODS AND APPARATUS TO DISRUPT THE ENGINE OF A VEHICLE

CROSS REFERENCE TO RELATED APPLICATIONS

The present application is a continuation-in-part of U.S. patent application Ser. No. 12/581,087, filed on Oct. 16, 2009, which is incorporated herein by reference.

BACKGROUND

As is known in the art, there are a variety of techniques to deal with vehicle drivers that do not operate their vehicle safely or have bad intentions. Exemplary techniques include road blocks, barricades, and tack strips. However, these techniques may have limited effectiveness and may present safety issues. For example, obstacles such as barricades, patrol cars, nets, and tack strips on a public road, can create dangerous conditions if vehicle operators escalate the situation. A driver may attempt to go through a roadblock by speeding through barricades. Furthermore, roadblocks typically require the services of law enforcement officers for setup, which requires advance notice and planning. In the event that the vehicle forces its way through the barricade, officers may engage in a dangerous high-speed pursuit.

Other known techniques for stopping vehicles include the use of electromagnetic pulse (EMP) or high power microwaves to disrupt the electronic components of the vehicles. However, the use of EMP to disable a moving vehicle requires high energy levels that are difficult to deploy in the field. Similarly, the use of high power microwaves requires a high power microwave source that is difficult to deploy and package. Furthermore, EMP and high power microwaves may be unsafe for people in the area of application. When high power microwaves or EMPs are used to stop a moving vehicle, microwave radiation is directed toward the vehicle to disable or inhibit electronic components of the vehicle. It is difficult to direct the microwave energy directly against a single vehicle. Thus, when the microwave radiation is adapted to disable a particular vehicle's electronic components, all or many of the vehicles in the vicinity of the targeted vehicle may also be temporarily or permanently disabled. Disabling non-targeted vehicles may become a hazard to law enforcement personnel and public.

SUMMARY

The present invention provides method and apparatus for disabling a vehicle by disrupting an engine control unit (ECU). In an exemplary embodiment, a receiver is used to monitor engine parameters, such as ignition timing, to detect disruption caused by a particular frequency transmitted by a transmit antenna. The system can dwell on this frequency to disable the vehicle. With this arrangement, a vehicle can be quickly and safely disabled. While exemplary embodiments of the invention are shown and described in conjunction with particular frequencies, power, vehicles and engine control unit characteristics, it is understood that embodiments of the invention are applicable to applications in which it is desirable to disrupt and/or stop an engine.

In one aspect of the invention, a system comprises: a transmit antenna, a controller to control frequencies transmitted by the transmit antenna, a receive antenna, and a signal processor to process information from the receive antenna to identify a frequency transmitted by the transmit antenna that disrupts operation of an engine, wherein the controller controls the signal transmitted by the transmit antenna to dwell on the frequency that disrupts the engine.

In another aspect of the invention, a vehicle checkpoint system comprises: at least one system to disable vehicles, comprising: a transmit antenna, a controller to control frequencies transmitted by the transmit antenna, a receive antenna, and a signal processor to process information from the receive antenna to identify a frequency transmitted by the transmit antenna that disrupts operation of an engine, wherein the controller controls the signal transmitted by the transmit antenna to dwell on the frequency that disrupts the engine.

In a further aspect of the invention, a method comprises: transmitting a range of frequencies targeting a vehicle, monitoring performance of an engine of the vehicle, determining a first frequency in the range of frequencies that disrupts operation of the engine from the engine performance monitoring, and dwelling on the first frequency to maintain disruption of the engine.

BRIEF DESCRIPTION OF THE DRAWINGS

The foregoing features of this invention, as well as the invention itself, may be more fully understood from the following description of the drawings in which.

DETAILED DESCRIPTION

In general, exemplary embodiments of the invention enable disruption of an engine control unit (ECU) of a vehicle. In one embodiment, a system employs a scanning VHF/UHF signal using RF tones to disrupt the vehicle ECU, detect the disrupting frequency, and dwell on the disrupting frequency to bring the vehicle to a stop. Exemplary embodiments of the system can be located at fixed location, such as a checkpoint, a mobile vehicle, or other platform.

Figure 1:
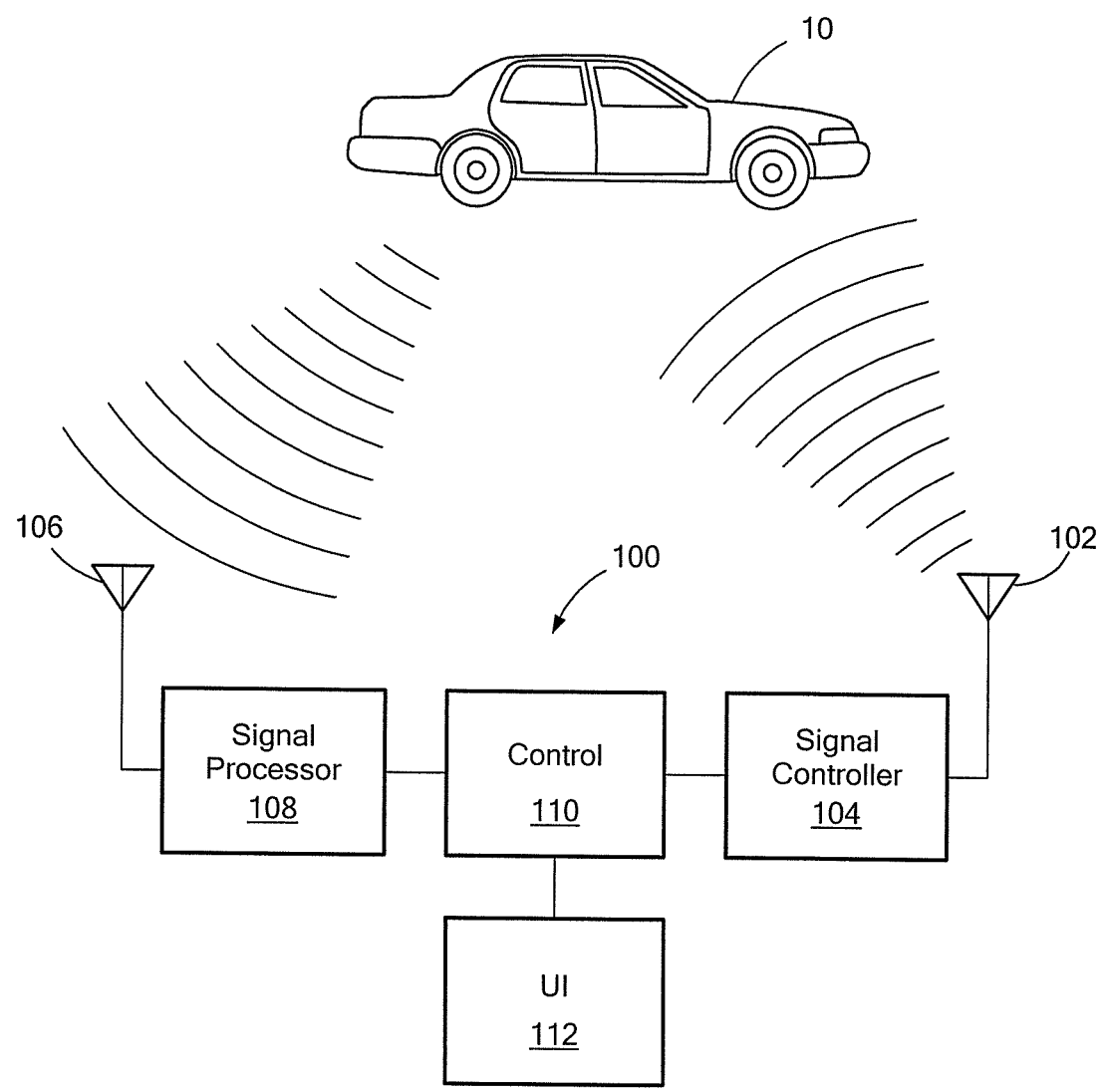
FIG. 1 is a schematic representation of an exemplary vehicle disruption system in accordance with exemplary embodiments of the invention.

FIG. 1 shows an exemplary vehicle disruption system 100 in accordance with exemplary embodiments of the invention. The system includes a transmit antenna 102 to transmit a range of frequencies while illuminating a target 10, such as vehicle. A signal controller 104 controls the characteristics of the transmitted signals.

A receive antenna 106 receives a signal emitted by the internal combustion engine ignition system of the vehicle 10. A signal processor 108 is coupled to the receive antenna 106 and to a control module 110 that controls overall operation of the system. A user interface 112 is coupled to the controller 110 to enable a user to interact with the system.

In general, signals emitted by the engine correspond to the vehicle ignition timing and other characteristics that factor in to frequency susceptibility of the internal combustion engine. The signal processor 108 analyzes the received information and determines scan and dwell tones that can be transmitted by the transmit antenna 102 to initiate disruption and eventual default of the ECU controlling the ignition timing of the internal combustion engine. In general, the signal controller 104 controls scan and dwell signal transmission over a defined frequency range to determine the optimally disruptive frequency tone by monitoring the ignition response. Continued signal transmission at the frequency of susceptibility results in ECU default until the signal is removed.

In one embodiment, a selected area is radiated for one or more specific vehicles. Since the transmitted frequency corresponds to engine timing for a specific vehicle, the system can disrupt a targeted vehicle in the midst of several vehicles without affecting the non-targeted vehicles. With an array for the transmission, the beam width can be narrow or wide depending on the application.

It is understood that with feedback from engine operation, it can be determined what frequency is effective to disrupt the engine ECU. It is believed that signals are coupling into the ECU through its wiring harness to cause the disruptive effect. It is believed that the disruptions are temporary because the communication between the ECU and sensors are 'jammed'.

By disrupting the vehicle ECU, the engine will stop in milliseconds. The ECU can go into a default mode in seconds, thereby requiring much less to power (e.g., 8 dB) to maintain disruption to the ECU and prevent the engine from restarting. Upon removal of the disrupting signal, the ECU can regain normal functionality without damage.

The closed loop feedback determines the most disruptive frequency tone to produce an ECU default. In addition, this results in an inability of the ECU to reacquire at a much lower power level. The disruptive dwell tone may be modulated to reduce the power level compared with a continuous wave transmitted tone.

It has been found that most ECUs have susceptible frequencies that fall within VHF and UHF bands. In one embodiment, a transmitter includes a power combined GaN Amplifier for provide CW power in the order of 170 kW for ECU disruption at about 100 m and for 10 m about 17 W.

Figure 2:
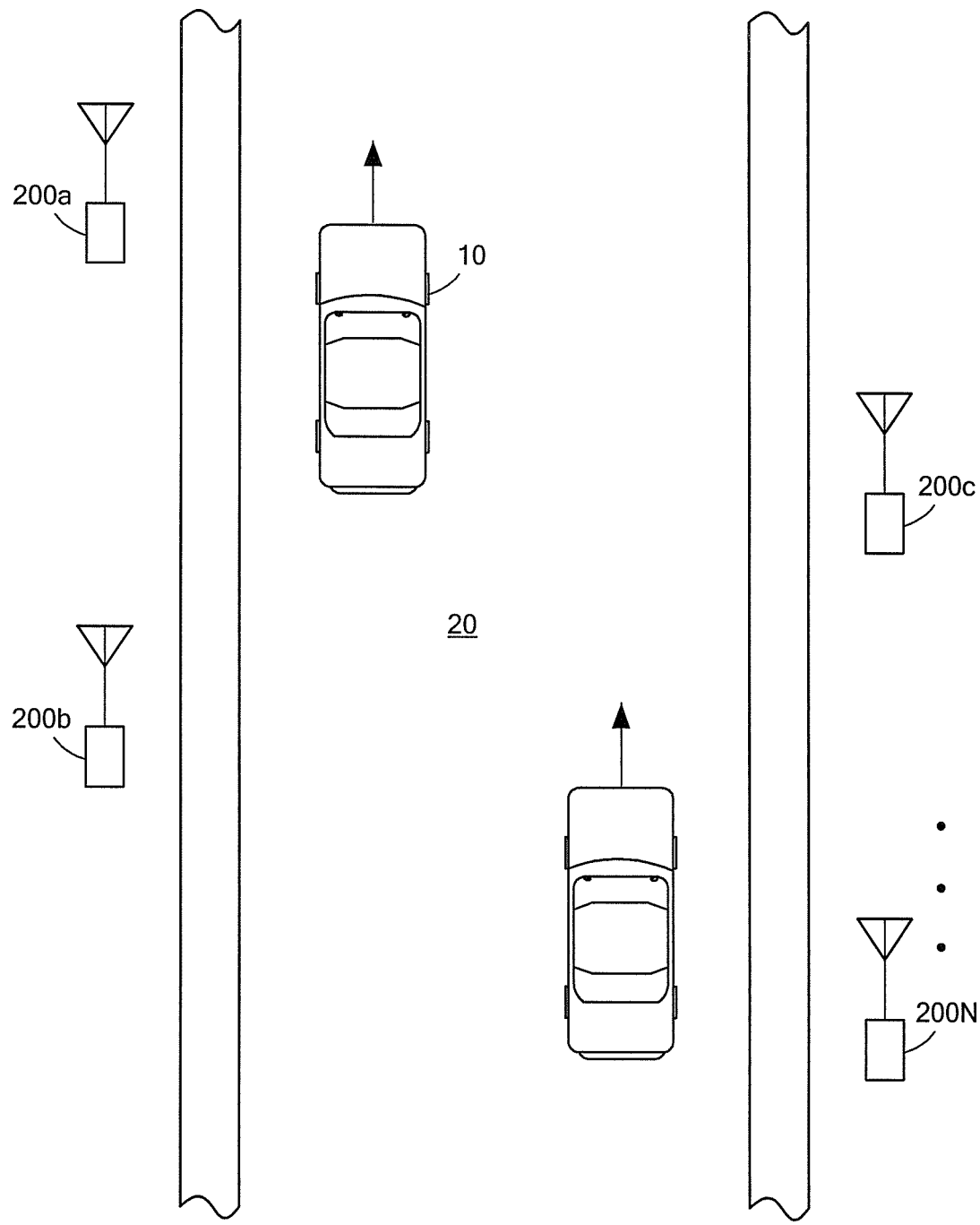
FIG. 2 is a schematic representation of a checkpoint having at least one vehicle disruption system.

In one embodiment shown in FIG. 2, a series of vehicle disruption systems 200a-N are distributed along a vehicle pathway 20. The distributed systems are synchronized by a remote receiver/processor to focus the energy at a target vehicle/ECU 10. With this arrangement, higher levels of energy are present at the target 20 to minimize energy levels in the area in the pathway vicinity. In one embodiment, a single receive antenna monitors engine operation of a targeted vehicle. This arrangement is well suited for vehicle checkpoints, such as border crossings.

In an exemplary embodiment, vehicle disruption systems are hidden and/or camouflaged. An aggressive vehicle can be disabled from a hidden disruption system. An operator of the vehicle may not even be aware that the vehicle has been targeted for disruption.

It should be noted that no a priori information is required by exemplary embodiments of a vehicle disruption system. The system 100 illuminates the vehicle over a range of frequencies, monitors a response of the vehicle engine, and identifies the frequency of the signal that disrupts operation of the vehicle ECU.

It is understood that embodiments of an inventive vehicle disruption system can be used for any vehicle having electronic ignition control. Exemplary vehicles include automobiles, motorcycles, boats, armored vehicles, snowmachines, and the like.

Figure 3:
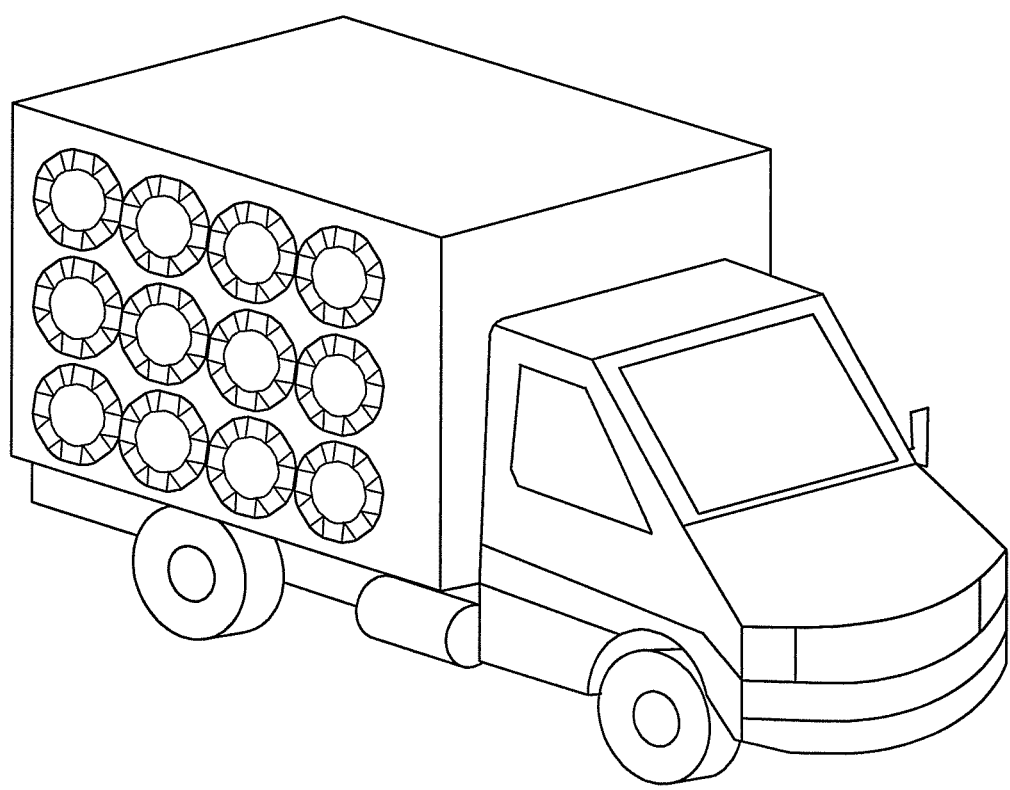
FIG. 3 is a pictorial representation of a transmit antenna array that can form a part of the system of FIG. 1.

A variety of suitable antennas can be used. In one particular embodiment, a transmit antenna comprises a series of antennas identified as Part No. FRF-110A from First RF corporation in Boulder, Colo. In one embodiment shown in FIG. 3, the antennas are arranged in a 3×4 lattice on a mobile platform shown as a truck. In one embodiment, the receive antenna is an omni operating at frequencies higher than those of the transmit antenna.

Figure 4:
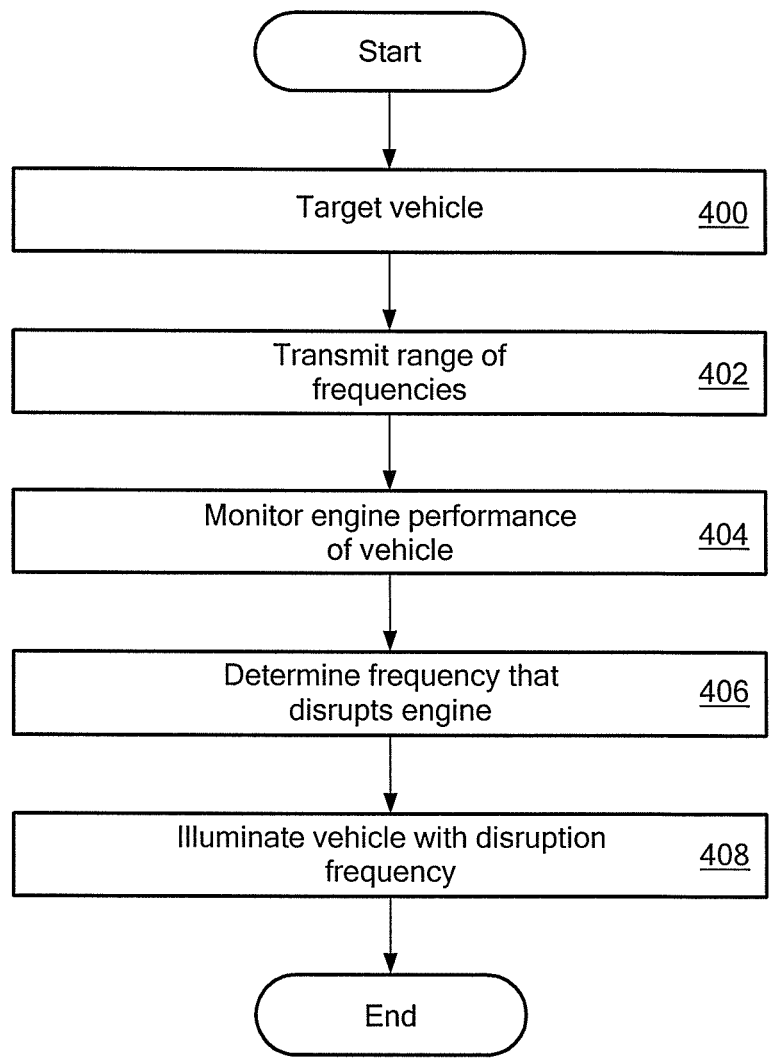
FIG. 4 is a flow diagram showing an exemplary sequence of steps for implementing vehicle disruption in accordance with exemplary embodiments of the invention.

FIG. 4 shows an exemplary sequence of steps for providing vehicle disruption in accordance with exemplary embodiments of the invention. In step 400, an object of interest, such as a vehicle, is targeted. The target is illuminated by transmitting signals in a range of frequencies in step 402. During illumination of the vehicle, in step 404 a receive antenna monitors operation of the engine, such as ignition timing. In step 406, the information from the receive antenna is used to detect disruption of engine operation due to the signals from the transmit antenna. More particularly, the system analyzes operation of the engine to identify the specific frequency that produces the most disruption. It is understood that transmit and receive operations are coordinated in a known manner. In step 408, the signal of maximum disruption is transmitted by the transmit antenna to disable the vehicle. Once the vehicle is disabled, the power level can be decreased to a level that prevents restart of the engine.

It is understood that engine operating characteristics can be stored in a database, as described in U.S. patent application Ser. No. 12/581,087, which is incorporated herein by reference.

Figure 5:
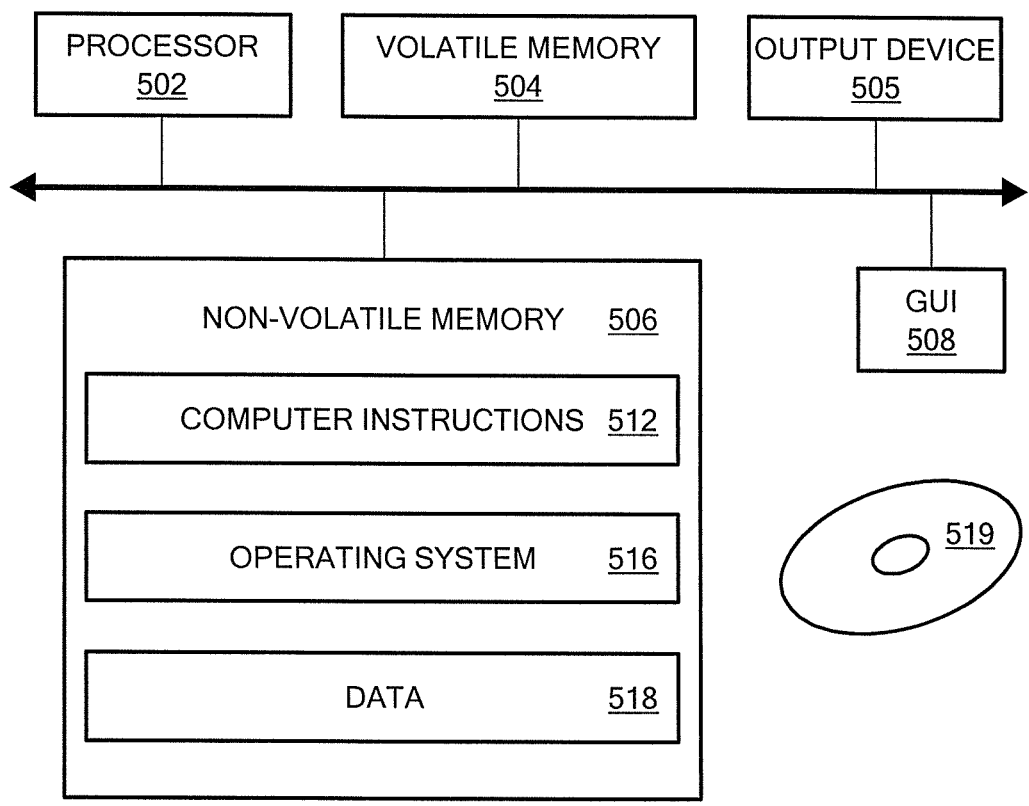
FIG. 5 is a schematic representation of an exemplary computer that can perform at least of the processing for vehicle disruption.

Referring to FIG. 5, a computer includes a processor 502, a volatile memory 504, an output device 505, a non-volatile memory 506 (e.g., hard disk), and a graphical user interface (GUI) 508 (e.g., a mouse, a keyboard, a display, for example). The non-volatile memory 506 stores computer instructions 512, an operating system 516 and data 518, for example. In one example, the computer instructions 512 are executed by the processor 502 out of volatile memory 504 to perform all or part of the processing described above. An article 519 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A system, comprising:
    a transmit antenna configured to transmit a range of frequencies targeting a to a target vehicle;
    a controller configured to control frequencies transmitted by the transmit antenna;
    a receive antenna configured to receive information from the target vehicle; and
    a signal processor configured to monitor the performance of an engine of the target vehicle by processing information from the receive antenna to identify a frequency transmitted by the transmit antenna that disrupts operation of the engine of a the target vehicle, wherein once the disruptive signal is identified the controller controls the signal transmitted by the transmit antenna to dwell on the frequency that disrupts the engine.

2. The system according to claim 1, wherein a range of frequencies for transmission by the transmit antenna range in specific region of the VHF/UHF bands.

3. The system according to claim 1, wherein the information from the receive antenna includes ignition timing.

4. The system according to claim 1, wherein the dwell frequency disrupts operation of an engine control unit (ECU) coupled to the engine.

5. The system according to claim 1, wherein the transmit antenna comprises an array.

6. The system according to claim 1, wherein the system is mounted on a remote vehicle.

7. The system according to claim 1, further including a vehicle checkpoint along a vehicle pathway.

8. A vehicle checkpoint system, comprising:
    at least one system to disable vehicles, comprising:
    a transmit antenna configured to transmit a range of frequencies to a target vehicle;
    a controller configured to control frequencies transmitted by the transmit antenna;
    a receive antenna configured to receive information from the target vehicle; and
    a signal processor configured to monitor the performance of an engine of the target vehicle by processing information from the receive antenna to identify a frequency transmitted by the transmit antenna that disrupts operation of the engine of a the target vehicle, wherein once the disruptive signal is identified the controller controls the signal transmitted by the transmit antenna to dwell on the frequency that disrupts the engine.

9. The system according to claim 8, wherein the at least one system to disable vehicles is hidden.

10. A method, comprising:
    transmitting a range of frequencies targeting to a target vehicle;
    controlling frequencies transmitted by the transmit antenna;
    receiving information from the target vehicle monitoring performance of an engine of the target vehicle;
    determining from the received information a first frequency in the range of frequencies that disrupts operation of the engine of the target vehicle from the engine performance monitoring; and
    dwelling on the first frequency to maintain disruption of the engine.

11. The method according to claim 10, wherein the vehicle comprises or more of an automobile, a truck, a boat, a helicopter, and/or snowmobile.

12. The method according to claim 10, further including reducing a power of the first frequency after the engine is disabled to a level that prevents engine restart.

13. The method according to claim 10, further including monitoring the vehicles at a vehicle checkpoint.

14. The method according to claim 10, wherein a range of frequencies for transmission by the transmit antenna range in specific regions of the VHF/UHF bands.

15. The method according to claim 10, wherein the information from the receive antenna includes ignition timing.

16. The method according to claim 10, wherein the dwell frequency disrupts operation of an engine control unit (ECU) coupled to the engine.

17. The method according to claim 10, wherein monitoring the performance of the engine includes closed loop feedback to determine a most disruptive frequency tone to an engine control unit (ECU) coupled to the engine.

18. The method according to claim 10, wherein the transmitted frequencies couple into an engine control unit (ECU) coupled to the engine through a wiring harness.

* * * * *